(12) United States Patent
Wichmann et al.

(10) Patent No.: US 11,420,373 B2
(45) Date of Patent: Aug. 23, 2022

(54) PREFORM DEVICE FOR POSITIONING EXTRUDED RUBBER MIXTURES, AND EXTRUDER MOLD SYSTEM COMPRISING THE PREFORM DEVICE FOR MOLDING EXTRUDED RUBBER MIXTURES INTO A COMPLETE RUBBER ELEMENT, AND CORRESPONDING EXTRUDER SYSTEM

(71) Applicant: Continental Reifen Deutschland GmbH, Hannover (DE)

(72) Inventors: Peter Wichmann, Neustadt (DE); Thomas Reinhardt, Barsighausen (DE); Stephan Disselhoff, Nienhagen (DE)

(73) Assignee: Continental Reifen Deutschland GmbH, Hannover (DE)

(*) Notice: Subject to any disclaimer, the term of this patent is extended or adjusted under 35 U.S.C. 154(b) by 234 days.

(21) Appl. No.: 16/641,231

(22) PCT Filed: May 8, 2018

(86) PCT No.: PCT/EP2018/061760
§ 371 (c)(1),
(2) Date: Feb. 22, 2020

(87) PCT Pub. No.: WO2019/037901
PCT Pub. Date: Feb. 28, 2019

(65) Prior Publication Data
US 2020/0215737 A1    Jul. 9, 2020

(30) Foreign Application Priority Data

Aug. 23, 2017    (DE) .................... 10 2017 214 756.3

(51) Int. Cl.
*B29C 48/07*    (2019.01)
*B29C 48/16*    (2019.01)
(Continued)

(52) U.S. Cl.
CPC .............. *B29C 48/07* (2019.02); *B29C 48/16* (2019.02); *B29C 48/304* (2019.02);
(Continued)

(58) Field of Classification Search
CPC ...... B29C 48/16; B29C 48/304; B29C 48/307
See application file for complete search history.

(56) References Cited

U.S. PATENT DOCUMENTS 4,358,261 A * 11/1982 Ohki ...................... B29B 7/603
425/131.1
4,683,095 A    7/1987 Tolonen et al.
(Continued)

FOREIGN PATENT DOCUMENTS

CN    1706622 A    12/2005
DE    102004052351 A1    6/2005
(Continued)

OTHER PUBLICATIONS

International Search Report dated Sep. 6, 2018 of international application PCT/EP2018/061760 on which this application is based.

*Primary Examiner* — Galen H Hauth
(74) *Attorney, Agent, or Firm* — Gregory Adams; David L. Cate

(57) ABSTRACT

The invention relates to a preform device for positioning extruded rubber mixtures, characterized in that the preform device consists of an inlet module (2) and an outlet module (3), wherein both the inlet module (2) and the outlet module (3) each have a base surface (11, 12) and a contact face (19, 21) opposite the base surface (11, 12, 13), and wherein the surface of the contact face (19, 21) of the inlet module (2) is smaller than the surface of the base surface (11, 12) of the inlet module (2). The invention also relates to an extruder mold system for molding extruded rubber mixtures into a complete rubber element (40), having the preform device
(Continued)

and at least one final forming device, and to a corresponding extruder system (22).

11 Claims, 5 Drawing Sheets

(51) Int. Cl.
  *B29C 48/49* (2019.01)
  *B29C 48/305* (2019.01)
  *B29C 48/30* (2019.01)
  *B29D 30/52* (2006.01)
  *B29L 30/00* (2006.01)

(52) U.S. Cl.
  CPC ............ *B29C 48/307* (2019.02); *B29C 48/49* (2019.02); *B29D 30/52* (2013.01); *B29L 2030/002* (2013.01)

(56) References Cited

U.S. PATENT DOCUMENTS

| 7,311,505 | B2* | 12/2007 | Ohki ................ B29C 48/307 425/133.5 |
| 2005/0208167 | A1 | 9/2005 | You et al. |
| 2005/0271761 | A1 | 12/2005 | Ohki et al. |
| 2012/0308755 | A1* | 12/2012 | Gorman .............. B29C 48/19 428/43 |
| 2018/0147769 | A1* | 5/2018 | Reineke ............ B29C 48/2566 |

FOREIGN PATENT DOCUMENTS

| EP | 0047146 A1 | 3/1982 |
| EP | 1604802 A2 | 12/2005 |
| JP | H06210699 A | 8/1994 |
| JP | 2015085544 A | 5/2015 |

\* cited by examiner

PREFORM DEVICE FOR POSITIONING EXTRUDED RUBBER MIXTURES, AND EXTRUDER MOLD SYSTEM COMPRISING THE PREFORM DEVICE FOR MOLDING EXTRUDED RUBBER MIXTURES INTO A COMPLETE RUBBER ELEMENT, AND CORRESPONDING EXTRUDER SYSTEM

The invention relates to a preform device for positioning extruded rubber mixtures and to an extruder mold system for molding extruded rubber mixtures into a complete rubber element, comprising the preform device and at least one final forming device. The invention also relates to an extruder system.

In the rubber industry, rubber mixtures are extruded in extruders and then formed into a complete rubber element with a predefined profile in an extruder mold system. Often, the extruder mold system comprises a preform device and a final forming device.

Extruder mold systems are known from the prior art. For example, U.S. Pat. No. 4,683,095 A discloses an extruder device, wherein the extruder device has a pre-die and a final die.

A preform device known from the prior art must frequently be used in conjunction with a final forming device, wherein the preform device has the task of guiding the individually extruded rubber mixtures from the extruder heads of an extruder system to a predetermined position at the final forming device. The final forming devices from the prior art then have solely the function of finally molding the already extruded rubber mixtures, and thus give the resulting complete rubber element a predefined profile.

The preform device is often very bulky and heavy. Also, it must be adapted precisely to the final forming device simultaneously used, since to produce a specific profile or specific composition of a complete rubber element, the preform and final forming devices must be matched to each other and also to the extrusion line used in the specific case.

On a change in the profile to be produced of the complete rubber element, or in the composition of individual rubber mixtures, it is therefore necessary to change both the entire bulky preform device and the final forming device. This change takes considerable time and therefore reduces the production time significantly. Also, maintenance and storage of the various preform devices and final forming devices takes up a great deal of time and space.

The invention is therefore based on the object of providing an improved preform device or an improved extruder mold system which in particular:
  allows simpler maintenance of the preform device or extruder mold system, and/or
  requires less time for converting production in the extrusion line to a new profile of a complete rubber element,
in comparison with solutions known from the prior art.

This object is achieved according to the invention by a preform device for positioning extruded rubber mixtures, characterized in that
  the preform device consists of an inlet module and an outlet module, wherein both the inlet module and the outlet module each have a base surface and a contact face opposite the base surface, and wherein
    the surface of the contact face of the inlet module is smaller than the surface of the base surface of the inlet module.

It is advantageous that a preform device according to the invention consists of an inlet and an outlet module, since the two modules can be inserted in a receiving device of an extruder system according to the invention independently of each other and from different directions. This means that only one module of a preform device according to the invention need be changed. It is also advantageous that the surface of the contact face of the inlet module is smaller than the surface of the base surface of the inlet module, since this allows easier insertion of the bulky inlet module into a receiving device of an extruder system according to the invention.

The surface of the contact face of the outlet module of a preform device according to the invention, referred to below simply as a device, may also be smaller than the surface of the base surface of the outlet module, or the surface of the base surface of the outlet module may be smaller than the surface of the contact face of the outlet module of a device according to the invention.

The expression "preform device" in the context of the present invention includes a pre-die. A preform device according to the invention is known to the person skilled in the art as a preform, or a pre-template, pre-strip or preform strip.

The expression "final forming device" in the context of the present invention includes a final die. A final forming device is also known to the person skilled in the art as a final former, final template, final strip or final forming strip.

In the context of the present invention, a rubber component preferably comprises an extruded rubber mixture.

In the context of the present invention, an inlet module of a preform device according to the invention is the part of the preform device according to the invention which guides the various rubber components from the extruder heads of an extruder system to as great as possible a number of different outlet modules of a preform device. This has the advantage that the inlet module of a preform device according to the invention need not be changed, or only changed in exceptional cases, when another rubber profile is to be produced.

In the context of the present invention, an outlet module of a preform device according to the invention is the part of the preform device according to the invention which can guide the various rubber components to as great as possible a number of different final forming devices, as described for example for an extruder mold system according to the invention as described below. This has the advantage that the outlet module of a preform device according to the invention in a specific extruder system need be changed more rarely than a preform device known in the prior art when another rubber profile is to be produced.

The advantage of the above-mentioned aspects of an inlet and outlet module of a preform device according to the invention is that only the final forming device, and very rarely the outlet module of the preform device according to the invention, need be changed, wherein this change takes considerably less time than changing the entire extruder mold system comprising a preform device according to the invention and a final forming device. Changing the outlet module can advantageously take place, as described above, independently of changing the inlet module. This is achieved not only by the modular structure of the preform device according to the invention but also in that the shape of the inlet module substantially tapers in the direction of the outlet module. This tapering of the shape of the inlet module is described more precisely in connection with the following preferred devices according to the invention. It is not necessary for every side face of the inlet module to taper in the direction of the contact face of the inlet module. Also, the tapering side face of an inlet module need not have a constant taper. Deviations from this taper may even be advantageous since they allow the insertion, attachment or interplay of an outlet module or the entire preform device according to the invention.

Preference is given to a device as described above, wherein both the inlet module and the outlet module each have at least two opposing side faces, a base surface and a contact face opposite the base surface, and wherein
the contact face of the inlet module is congruent with the contact face of the outlet module,
and
the two opposing side faces of the inlet module each have a trapezoid surface with a taper angle $ß_{In}$, and each of the two opposing side faces tapers towards the contact face of the inlet module,
and/or
the two opposing side faces of the outlet module each have a trapezoid surface with a taper angle $ß_{Out}$, and each of the two opposing side faces tapers towards the contact face of the outlet module.

The base surface and the contact face of an inlet module of a preform device according to the invention lie opposite each other. The edges of the base surface and the edges of the contact face directly adjoin a side face of the inlet module. The base surface of the inlet module of a preform device according to the invention must be designed such that the various rubber components can be conducted from the outlets of the flow ducts of the extruder head of an extruder system according to the invention into a respective corresponding inlet of the flow ducts at the base surface of the inlet module. The flow ducts of the inlet module guide the various rubber components from the inlets at the base surface of the inlet module to the respective outlets of the flow ducts at the contact face of the inlet module.

The base surface and the contact face of an outlet module of a preform device according to the invention lie opposite each other. The edges of the base surface and the edges of the contact face directly adjoin a side face of the outlet module. The flow ducts of the outlet module guide the various rubber components from the inlets at the contact face of the outlet module to the respective outlets of the flow ducts at the base surface of the outlet module. The base surface of the outlet module of a preform device according to the invention must be designed such that the various rubber components can be conducted from the outlets of the flow ducts at the base surface of the outlet module into a respective corresponding inlet of the flow ducts of a final forming device.

The advantage of the above-mentioned tapering of the side face of the inlet module or outlet module is the above-mentioned simplified insertion of the inlet module or outlet module into a receiving device of an extruder system according to the invention, where said modules can be inserted in the receiving device or removed therefrom independently of each other.

The trapezoid surfaces of the side faces of the respective module are delimited by an edge of the base surface of the respective module and an edge of the contact face of the respective module and by at least two side face edges, preferably four, particularly preferably six, quite particularly preferably eight, in particular quite particularly preferably ten side face edges. The edge of the base surface and the edge of the contact face of the respective module which delimit a trapezoid surface of a side face preferably run parallel. Two of the at least two side face edges however do not run parallel. The taper angle $ß_{In}$ for the inlet module is shown in FIG. 8, and the taper angle $ß_{Out}$ for the outlet module is shown in FIG. 9. Both taper angles $ß_{In}$ and $ß_{Out}$ are formed by the respective contact face and the respective side face, as shown in FIG. 8 or FIG. 9.

Preference is given to a device as described above or as described above as preferred, wherein
the base surface of the inlet module or outlet module and the contact face of the inlet module or outlet module are geometrically similar,
and/or
the surface of the contact face of the inlet module is geometrically similar to the surface of the contact face of the outlet module.

The above-mentioned aspect of the present invention is advantageous since the number of edges of the contact face of the inlet module and the number of edges of the contact face of the outlet module are the same. This facilitates the geometric arrangement of the inlet module relative to the outlet module on insertion in the receiving device of the extruder system.

In the context of the present invention, the term "congruent" preferably means that two surfaces can be superposed to cover each other by suitable rotation or reflection, or preferably means the mathematical definition.

In the context of the present invention, the expression "geometrically similar" preferably means that two surfaces can be deformed by electrical elongation to be congruent, or preferably means the mathematical definition.

Particular preference is given to a device as described above or as described above as preferred, wherein
the base surface of the inlet module and the contact face of the inlet module are geometrically similar,
and/or
the base surface of the outlet module and the contact face of the outlet module are geometrically similar.

The above-mentioned aspect of the present invention is advantageous since the number of edges of the base surface of a module and the number of edges of a contact face of the same module are the same. This facilitates construction and production of the inlet module and outlet module.

Preference is given to a device as described above or as described above as preferred, wherein
the base surface of the inlet module and the contact face of the inlet module are substantially round or polygonal,
and/or
the base surface of the outlet module and the contact face of the outlet module are substantially round or polygonal.

Particularly preferably, the base surface of the inlet module, the contact face of the inlet module, the base surface of the outlet module and the contact face of the outlet module are substantially polygonal, quite particularly substantially quadrangular.

The above-mentioned aspect of the present invention is advantageous since a polygonal design of the inlet module and outlet module, because of the polygonal surfaces, allows easier insertion of the inlet module or outlet module in the receiving device of the extruder system. The edges help guide the respective module into the receiving device.

Preference is given to a device as described above or as described above as preferred, wherein the surface of the contact face of the inlet module is congruent with the surface of the contact face of the outlet module.

The above-mentioned aspect of the present invention is advantageous since the entire surface of the contact face of the inlet module and the entire surface of the contact face of the outlet module can be used to convey the various rubber components from the inlet module into the outlet module.

Also, construction of the receiving device of the extruder system is simplified by having two contact faces of the same size.

Advantageously, the contact faces of the inlet module and outlet module are structured such that the two contact faces lie sealingly against each other. For this, often a specific pressure must be applied which presses the contact faces together. The congruence of the two contact faces guarantees that when the two contact faces are frequently pressed together, no imprints or other material damage occurs on one of the contact faces.

Preference is given to a device as described above or as described above as preferred, wherein both the inlet module and the outlet module are each delimited by a base surface and a contact face and at least two side faces, preferably four, particularly preferably six, quite particularly preferably eight, in particular quite particularly preferably ten or twelve side faces.

Because two side faces of the inlet module and two side faces of the outlet module taper towards a respective contact face, it is possible to introduce both the inlet module and the outlet module into the receiving device of an extruder system according to the invention from opposite directions and fix them there.

To insert the inlet module into the provided receiving device of an extruder system according to the invention, it is necessary for the receiving device to be separated from the extruder head so that the inlet module can then be inserted in the receiving device.

Separation from the extruder head may take considerable time, and is unavoidable on a change of rubber profile with the preform devices known from the prior art. However, because of the modular structure of a preform device according to the invention, it is only very rarely necessary to change the inlet module, whereby a substantial time-saving can be achieved on a change of rubber profile and hence a change of preform device.

On a change of rubber profile, on insertion of a preform device according to the invention, only the final forming device and the outlet module of the preform device according to the invention must be removed. Changing an outlet module of a preform device according to the invention and a final forming device however takes a significantly time than changing a bulky preform device known from the prior art and a final forming device known from the prior art.

The taper angle $ß_{In}$ need not be the same for both of the two opposing side faces, but the taper angle of the one side face may have a different value in amount from the taper angle of the other side face. The same applies to the taper angle $ß_{Out}$ of the two opposing side faces of the outlet module.

The contact face of the inlet module of a preform device according to the invention must be designed such that the various rubber components can be conducted from the outlets of the flow ducts of the inlet module into a respective corresponding inlet of the flow ducts of the outlet module.

Preferably, the contact face of the inlet module of a preform device according to the invention is congruent with and/or has a similar surface to the contact face of the outlet module of a preform device according to the invention, so that after insertion in the receiving device of an extruder system according to the invention, the two contact faces lie congruently on each other.

Preference is given to a device as described above or as described above as preferred, wherein the total weight of the preform device is more than 25 kg, preferably more than 27 kg, and the total weight of the outlet module of the preform device is less than 20 kg, preferably less than 15 kg.

The above-mentioned aspect of the present invention has the advantage that lighter outlet modules can be changed more ergonomically.

Preference is given to a device as described above or as described above as preferred, wherein both the inlet module and the outlet module have at least a first flow duct provided for the arrangement of a first rubber component, a second flow duct provided for the arrangement of a second rubber component, and a third flow duct provided for the arrangement of a third rubber component.

The above-mentioned aspect of the present invention has the advantage that when three rubber components are used, there is a relatively large number of different combinations of rubber components forming a rubber profile, which must usually be changed regularly. The time-saving is thus a particularly great advantage for preform devices with at least three flow ducts, such as for example a preform device for tire treads.

Preference is given to a device as described above or as described above as preferred, wherein both the inlet module and the outlet module have at least a fourth flow duct provided for the arrangement of a fourth rubber component, and/or a fifth flow duct provided for the arrangement of a fifth rubber component.

The above-mentioned aspect of the present invention has the advantage that changing the preform device takes more time in quadruplex and quintuplex extruder systems than when only three rubber components are extruded, and hence time is saved when using the preform device according to the invention. Also, when quadruplex and quintuplex extruder systems are used, the rubber profiles to be produced are changed particularly frequently, for example because a smaller quantity per product series may be required.

Preference is given to a device as described above or as described above as preferred, wherein the inlet module and/or the outlet module of the preform device are suitable for attachment to the receiving device of an extruder system by means of a fixing device.

The above-mentioned aspect of the present invention has the advantage that both the inlet module and the outlet module can be attached to the receiving device independently of each other. The inlet module or outlet module may be fixed by means of an eccentric lock as a fixing device. This serves in particular to secure the inlet module and outlet module.

Particular preference is given to a device as described above or as described above as preferred, wherein the inlet module of the preform device has a length in the range from 300 mm to 1200 mm, preferably in the range from 400 mm to 800 mm, particularly preferably in the range from 450 mm to 550 mm, quite particularly preferably 500 mm. The length of the inlet module of a preform device according to the invention is preferably the maximal horizontal extension of the base surface of the inlet module during positioning of extruded rubber mixtures by means of a preform device according to the invention in the extruder system. Particularly preferably, the length runs perpendicularly to the height and depth of the inlet module, as described below.

Particular preference is given to a device as described above or as described above as preferred, in particular as described above as particularly preferred, wherein the inlet module of the preform device has a height in the range from 60 mm to 300 mm, preferably in the range from 80 to 270 mm, quite particularly preferably in the range from 120 to 250 mm. The height of the inlet module of a preform device according to the invention is preferably the maximal vertical extension of the base surface of the inlet module during positioning of extruded rubber mixtures by means of a preform device according to the invention in the extruder system. Particularly preferably, the height of the inlet module of a preform device according to the invention is the distance between the two geometric center points of the two opposing side faces with a trapezoid surface.

Particular preference is given to a device as described above or as described above as preferred, in particular as described above as particularly preferred, wherein the inlet module of the preform device has a depth in the range from 40 mm to 150 mm, preferably in the range from 50 to 100 mm, quite particularly preferably in the range of 60 mm.

The depth of the inlet module preferably extends in the extrusion direction and is particularly preferably the distance from the geometric center point of the contact face of the inlet module to the geometric center point of the base surface of the inlet module.

Particular preference is given to a device as described above or as described above as preferred, in particular as described above as particularly preferred, wherein the inlet module of the preform device has a taper angle $ß_{In}$ in the range from 30 to 600, particularly preferably in the range from 30 to 450, preferably 30.5°.

The taper angle $ß_{In}$ is preferably the angle as defined above.

The above-mentioned aspect of the present invention has the advantage that when the ranges described above are used, no particularly great pressure need be exerted on the rubber components in order to press the respective rubber component through its flow duct.

Particular preference is given to a device as described above or as described above as preferred, in particular as described above as particularly preferred, wherein the outlet module of the preform device has a length in the range from 300 mm to 1200 mm, preferably in the range from 400 mm to 800 mm, particularly preferably in the range from 450 mm to 550 mm, quite particularly preferably 500 mm.

The length of the outlet module of a preform device according to the invention is preferably the maximal horizontal extension of the base surface of the outlet module during positioning of extruded rubber mixtures by means of a preform device according to the invention in the extruder system. Particularly preferably, the length runs perpendicularly to the height and depth of the outlet module.

Particular preference is given to a device as described above or as described above as preferred, in particular as described above as particularly preferred, wherein the outlet module of the preform device has a height in the range from 60 mm to 300 mm, preferably in the range from 100 to 250 mm, particularly preferably in the range from 170 to 220 mm. The height of the outlet module of the preform device according to the invention is preferably the maximal vertical extension of the base surface of the outlet module during positioning of extruded rubber mixtures by means of a preform device according to the invention in the extruder system. Particularly preferably, the height of the outlet module of a preform device according to the invention is the distance between the two geometric center points of the two opposing side faces with a trapezoid surface.

Particular preference is given to a device as described above or as described above as preferred, in particular as described above as particularly preferred, wherein the outlet module of the preform device has a depth in the range from 40 mm to 150 mm, preferably in the range from 50 to 100 mm, particularly preferably in the range from 50 to 70 mm. The depth of the outlet module is preferably the distance from the geometric center point of the contact face of the outlet module to the geometric center point of the base surface of the outlet module.

Particular preference is given to a device as described above or as described above as preferred, in particular as described above as particularly preferred, wherein the outlet module of the preform device has a taper angle $ß_{Out}$ in the range from 15° to 120°, preferably in the range from 45° to 100°, particularly preferably in the range from 75° to 90°.

The taper angle $ß_{Out}$ is preferably the angle as defined above.

The above-mentioned aspect of the present invention has the advantage that when the ranges described above are used, no particularly great pressure need be exerted on the rubber components in order to press the respective rubber component through its flow duct.

Preference is given to a device as described above or as described above as preferred, in particular as described above as particularly or in particular preferred, wherein a seal is attached to the contact face of the inlet module and/or to the contact face of the outlet module, wherein the seal is preferably suitable for preventing an escape of a rubber mixture from the flow ducts at the contact face of the inlet module and at the contact face of the outlet module while the contact face of the inlet module is in contact with the contact face of the outlet module.

The above-mentioned aspect of the present invention has the advantage that an escape of a rubber mixture from the flow ducts between the inlet and outlet module is prevented.

Particular preference is given to a preform device for positioning extruded rubber mixtures, characterized in that
  the preform device consists of an inlet module and an outlet module,
  wherein both the inlet module and the outlet module are each delimited by four side faces, a base surface and a contact face, and wherein
    the contact face of the inlet module is geometrically the same as the contact face of the outlet module,
    at least two opposing side faces of the inlet module each have a trapezoid surface with a taper angle $ß_{In}$, and each of the two opposing side faces tapers towards the contact face of the inlet module,
    at least two opposing side faces of the outlet module each have a trapezoid surface with a taper angle $ß_{Out}$, and each of the two opposing side faces tapers towards the contact face of the outlet module,
    the total weight of the preform device is more than 27 kg,
    the total weight of the outlet module of the preform device is less than 15 kg,
    both the inlet module and the outlet module have at least
      a first flow duct provided for the arrangement of a first rubber component,
    and
      a second flow duct provided for the arrangement of a second rubber component, and
a third flow duct provided for the arrangement of a third rubber component.
and
a fourth flow duct provided for the arrangement of a fourth rubber component,
and
a fifth flow duct provided for the arrangement of a fifth rubber component,
both the inlet module and the outlet module of the preform device are suitable for attachment to the receiving device of an extruder system,
the inlet module of the preform device has a taper angle $ß_{in}$ in the range from 30 to 450,
and
the outlet module of the preform device has
a length in the range from 450 mm to 550 mm,
and
a height in the range from 170 to 220 mm,
and
a depth in the range from 50 mm to 70 mm,
and
a taper angle $ß_{Out}$ in the range from 45° to 100°.

The invention also relates to an extruder mold system for molding extruded rubber mixtures into a complete rubber element, having a preform device as claimed in any of the preceding claims, and at least one final forming device for molding extruded rubber mixtures into a complete rubber element.

The final forming device described above is described in more detail below in various aspects.

The above-mentioned advantageous aspects of a preform device according to the invention for positioning extruded rubber mixtures also apply to all aspects of an extruder mold system described below for molding extruded rubber mixtures into a complete rubber element, and the advantageous aspects discussed below of extruder mold systems according to the invention apply accordingly to all aspects of a preform device according to the invention for positioning extruded rubber mixtures.

Preference is given to an extruder mold system as described above, or as described above as preferred, wherein the outlet module of the preform device can be attached to the final forming device by means of an attachment device.

The above-mentioned aspect of the present invention has the advantage that the outlet module of the preform device according to the invention can be removed from the extruder mold system according to the invention at the same time as the final forming device and without the inlet module, and/or the final forming device need not be re-attached additionally at another position on the extruder system. This serves amongst others to save time when changing to another profile of a complete rubber element.

The invention also relates to an extruder system comprising
a preform device as described above or as described above as preferred, or as described above as particularly or in particular preferred,
and/or
a receiving device for receiving an extruder mold system as described above or as described above as preferred, wherein the receiving device is preferably oriented such that
the inlet module of a preform device as described above or as described above as preferred, or as described above as particularly or in particular preferred,
and
the outlet module of a preform device as described above or as described above as preferred, or as described above as particularly or in particular preferred,
can be inserted in the receiving device, particularly preferably can be inserted in the receiving device with precise fit. Particularly preferably, the inlet module can be received in the receiving device from the opposite direction compared with the receiving device of the outlet module. Quite particularly preferably, the outlet module may be received against the extrusion direction.

The above-mentioned advantageous aspects of a preform device according to the invention for positioning extruded rubber mixtures, and of an extruder mold system according to the invention for molding extruded rubber mixtures, also apply to all aspects of an extruder system described below. This applies in particular to all above-mentioned aspects concerning the receiving device of an extruder system.

The expression "insert with precise fit" in the context of the present invention preferably means that the modules can be inserted in the receiving device of an extruder system according to the invention in or opposite the extrusion direction, and in the final position the side faces of the inlet and/or outlet module touch the receiving device.

Further features, advantages and details of the above-mentioned final forming device of an extruder mold system according to the invention, to which the invention is not however restricted in its scope, are now described in more detail below with reference to the following aspects:

1. A final forming device for molding extruded rubber mixtures into a complete rubber element, having a first flow duct, characterized in that the final forming device has one, two, three, four, five, six or more vertically displaceable components in the first flow duct,
   wherein by the movement of the displaceable components, the final forming device is suitable for forming complete rubber elements with different heights and/or widths.
2. The device according to aspect 1, wherein at least one of the vertically displaceable components has a height in the range from 15 mm to 120 mm, preferably in the range from 20 mm to 100 mm, particularly preferably in the range from 30 to 60 mm, and/or a depth in the range from 8 mm to 25 mm, preferably in the range from 14 mm to 16 mm, and/or a width in the range from 1 mm to 10 mm, preferably a width in the range from 4 mm to 6 mm.
3. The device according to any of the preceding aspects, wherein at least one of the vertically displaceable components can be moved in the vertical direction by 5 mm to 60 mm, preferably by 5 mm to 25 mm, particularly preferably by 5 mm to 15 mm.
4. The device according to any of the preceding aspects, wherein the final forming device has a number of vertically displaceable components in the range from 40 to 400, preferably a number from 50 to 200, particularly preferably a number from 70 to 80.
5. The device according to any of the preceding aspects, wherein the first flow duct has
   a width in the range from 100 mm to 1000 mm, preferably in the range from 150 mm to 400 mm, and/or
   a depth in the range from 10 to 50 mm, preferably in the range from 15 to 25 mm.
6. The device according to any of the preceding aspects, wherein one, two or more locking devices for fixing the vertically displaceable components exert a pressure on one of the two end-mounted or on both end-mounted vertically displaceable components of the vertically displaceable components, such that all of the vertically displaceable components are clamped in a preset position.
7. The device according to any of the preceding aspects, wherein all of the displaceable components have a U-shaped cross-section in the extrusion direction which is suitable for vertical guidance of the vertically displaceable components with precise fit.
8. The device according to aspect 7, wherein the notch in the U shape of all vertically displaceable components in cross-section has a height extension in the range from 5 mm to 70 mm, preferably in the range from 10 mm to 35 mm, particularly preferably in the range from 15 to 25 mm.

DESCRIPTION OF FIGURES

The drawing shows.

FIG. 1 shows a schematic depiction of the process arrangement in an extruder system 22. The figure shows the flow ducts 30 with associated extruder heads which bring the various rubber components to the preform device 1, from where they are conveyed further in the extrusion direction 15 to the final forming device 20. The final forming device 20 here molds the complete rubber element 40 which results as the final product of the extrusion process.

FIG. 2 shows a schematic depiction of the insertion of an outlet module 3 and an inlet module 2 of a preform device 1 according to the invention in a receiving device 18 of an extruder system. The figure shows that the side face 4 of the inlet module tapers towards the contact face 19 of the inlet module 2, whereby the inlet module 2 may be received in the receiving device 18 with precise fit in the extrusion direction 15. In contrast, the outlet module 3 of the preform device 1 according to the invention is received in the receiving device 18 of the extruder system against the extrusion direction 15. Because of this design, it is possible to remove the outlet module 3 from the receiving device 18 of the extruder system independently and in particular without removing the inlet module 2. Insertion of the outlet module 3 with precise fit is also guaranteed by the tapering side face 5 of the outlet module 3, as described above for the inlet module 2.

FIG. 3 shows a schematic depiction of a cross-section through a preform device 1 according to the invention, consisting of an inlet module 2 and an outlet module 3, in a further embodiment, wherein the plane of the cross-section runs parallel to the extrusion direction 15. The outlet module 3 and the inlet module 2 of the preform device 1 according to the invention are arranged in FIG. 2 such that the contact face 19 of the inlet module 2 lies directly opposite the contact face 21 of the outlet module 3. FIG. 3 shows that the first, second and third flow ducts 6, 7, 8 bring together the various rubber elements from the base surface 12 of the inlet module 2 towards the base surface 13 of the outlet module 3, so that the various rubber elements are in the correct position for then being transferred to a final forming device (not shown) for molding the complete rubber element. The preform device 1 according to the invention, shown in FIG. 3, therefore positions the individual rubber components, each comprising an extruded rubber mixture, which are pressed through the flow ducts 6, 7, 8.

FIG. 4 shows a schematic depiction of a view onto the side of the outlet module 3 of a preform device 1 according to the invention in a further embodiment, which comprises the base surface 11 of the outlet module 3. The figure shows the outlet openings 13 of the flow ducts 6, 7, 8 of the outlet module 3 which lie in the base surface 11 of the outlet module 3. The base surface 11 of the outlet module 3, shown in FIG. 4, of a preform device 1 according to the invention is polygonal. The two outer outlet openings 13 of the flow ducts 17 of the outlet module 3 in practice often constitute the outlet openings 13 of the flow ducts 17 for the wing components of a tire tread, while the middle outlet openings 13 of the flow ducts 17 of the outlet module 3 frequently position the base components. A tire tread is one example of a complete rubber element.

FIG. 5 shows a schematic depiction of a view onto an inlet module 2 of a preform device 1 according to the invention, showing the side of the inlet module 2 which comprises the base surface 12 of the inlet module 2. The figure shows the various inlet openings 14 of the flow ducts of the inlet module 2 through which the individual rubber components are pressed from the extruder heads of the extruder system (not shown) into the inlet module 2 of a preform device 1 according to the invention. The two outer inlet openings 14 of the flow ducts 16 of the inlet module 2 in the base surface 12 of the inlet module 2 in practice often constitute the inlet openings 14 for such flow ducts 16 which convey the wing components of a tire tread. The other inlet opening 14 shown in FIG. 5 constitutes the inlet opening of the flow duct 16 for the base component of the tire tread. The inlet module 2 shown in FIG. 5 of a preform device 1 according to the invention therefore comprises three flow ducts for a maximum of three different rubber components. A tire tread often has three rubber components and is therefore an example of a complete rubber element.

FIG. 6 shows a schematic depiction of a view onto an inlet module 2 of a preform device 1 according to the invention, showing the side of the inlet module 2 which comprises the contact face 19 of the inlet module 2. The figure shows the contact face 19 of the inlet module 2 of a preform device 1 according to the invention, and the various flow ducts 16 of the inlet module 2 which guide the flow ducts from the extruder heads of the extruder system to the flow ducts of the outlet module of a preform device according to the invention. It shows also the various side faces 10 of the inlet module 2, and the side face 4 of the inlet module 2 which has a trapezoid surface tapering towards the contact face 19. Because of this taper, the inlet module 2 may be received in the receiving device of an extruder system according to the invention in the opposite direction, wherein the term "opposite direction" refers to the receiving device of the outlet module.

FIG. 7 shows a schematic depiction of a view onto the side of the outlet module 3 of a preform device 1 according to the invention in a further embodiment, which comprises the contact face 12 of the outlet module 3. The figure shows the contact face 21 of the outlet module 3 of a preform device 1 according to the invention, and the various flow ducts 17 of the outlet module 3 which guide the extruded rubber mixtures from the flow ducts of the inlet module of a preform device according to the invention to a final forming device. It shows also the various side faces 9 of the outlet module 3, and the side face 5 of the outlet module 3 which has a trapezoid surface tapering towards the contact face 21. Because of this taper, the outlet module 3 may be received in the receiving device of an extruder system according to the invention in the opposite direction, wherein the term "opposite direction" refers to the receiving device of the inlet module.

FIG. 8 shows a schematic depiction of a side view onto an inlet module 2 of a preform device 1 according to the invention, showing the side face 4 with trapezoid surface of the inlet module 2. It also shows the taper angle $ß_{In}$ 23.

FIG. 9 shows a schematic depiction of a side view onto an outlet module 3 of a preform device 1 according to the invention, showing the side face 5 with trapezoid surface of the outlet module 3. It also shows the taper angle $ß_{Out}$ 24.

FIG. 10 shows a schematic depiction of a portion of a final forming device 20 of an extruder mold system according to the invention in one embodiment, wherein the cross-sectional plane runs perpendicularly to the extrusion direction 15. Some of the vertically displaceable components 25 have been moved vertically in comparison with the first end-mounted vertically displaceable component 26 shown. In the embodiment of the present invention shown in FIG. 10, the first end-mounted vertically displaceable component 26 is in the lowest position, so that at this point no rubber mixture can emerge. FIG. 10 also shows that, because of the above-mentioned component 25 which has been moved vertically upward, an outlet opening 31 is created for the flow duct of the final forming device. It is evident that the profile of the complete rubber element 40 changes depending on how the vertically displaceable components 25 have been moved. FIG. 10 also shows the extrusion direction 15 and a locking device 10 for fixing the vertically displaceable components 25. The locking device 10 is pressed onto the first end-mounted vertically displaceable component 26 such that the resulting pressure on the first displaceable component 26 and the vertically displaceable components 25 situated behind it is sufficiently large to fix the individual vertically displaceable components 25 in their respective preset positions. The force must be sufficient for the various vertically displaceable components not to move, even during operation, under the high pressure of the rubber mixtures during molding. Preferably, the locking device 29 is a screw as described in one embodiment above which is tightened with a tightening torque of maximum 20 Nm.

LIST OF REFERENCE SIGNS

Figure 1:
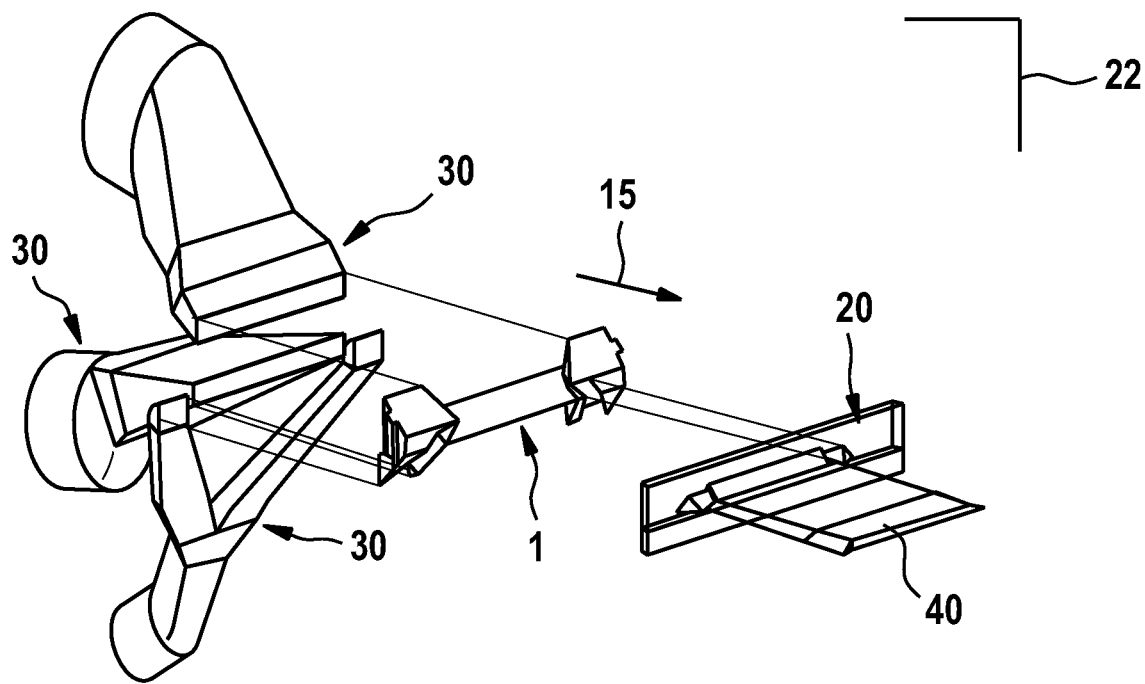
FIG. 1: a schematic depiction of the process arrangement of the extruder heads, the preform device, the final forming device and the resulting complete rubber element in an extruder system.
Figure 2:
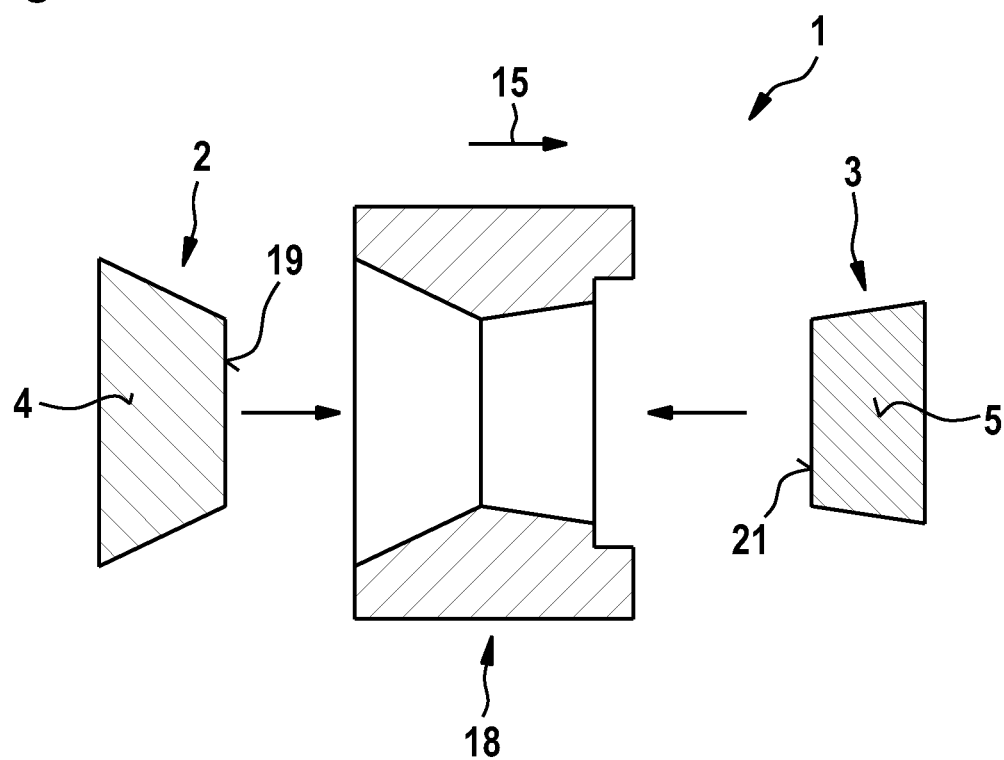
FIG. 2: a schematic depiction of the insertion of the inlet module and outlet module of a preform device according to the invention in a receiving device of an extruder system.
Figure 3:
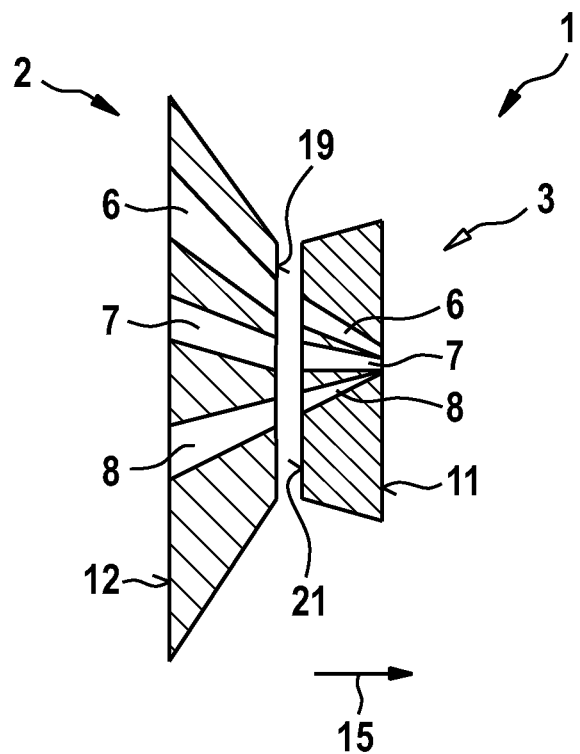
FIG. 3: a schematic depiction of the arrangement of flow ducts in an inlet module and outlet module of a preform device according to the invention.
Figure 4:
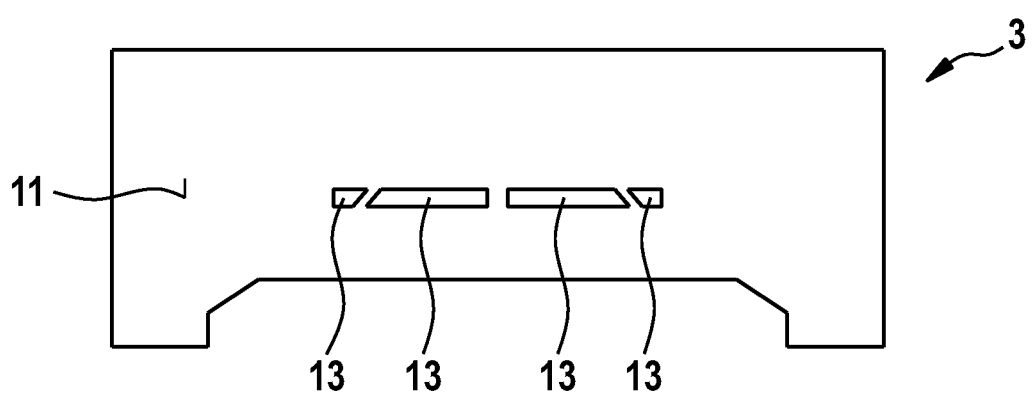
FIG. 4: a top view of a base surface, depicted schematically, of an outlet module of a preform device according to the invention.
Figure 5:
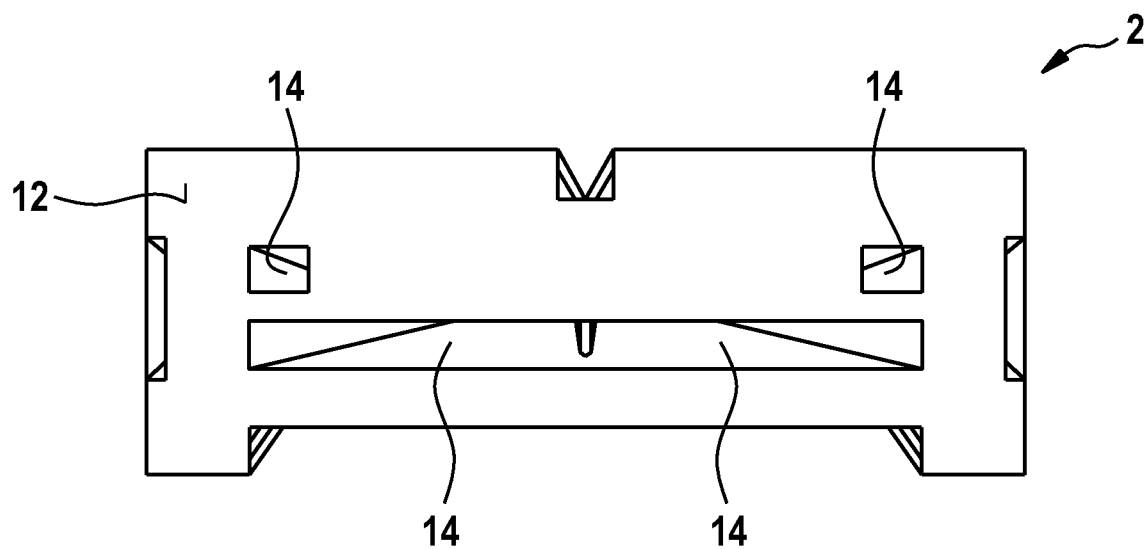
FIG. 5: a top view of a base surface, depicted schematically, of an inlet module of a preform device according to the invention.
Figure 6:
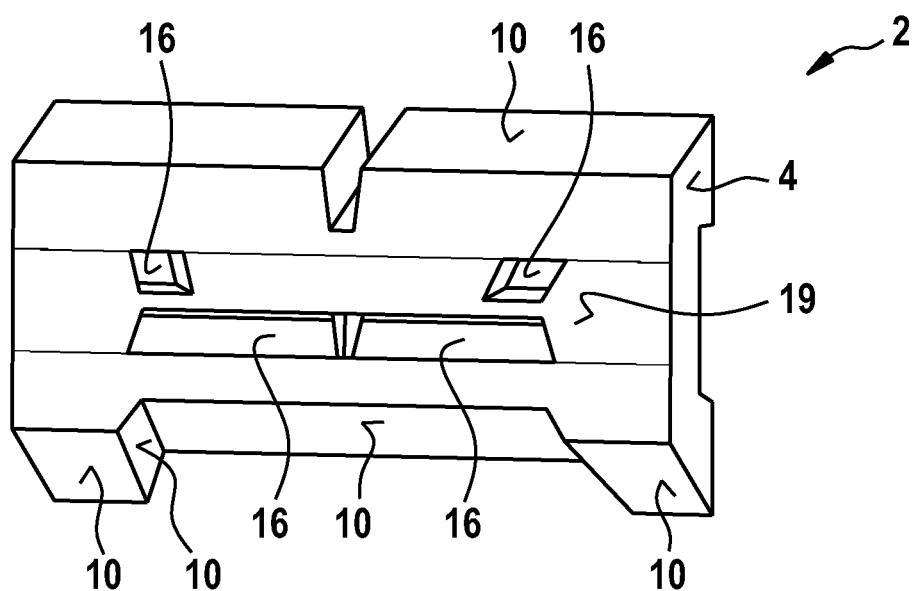
FIG. 6: a view of an outlet module, depicted schematically, of a preform device according to the invention.
Figure 7:
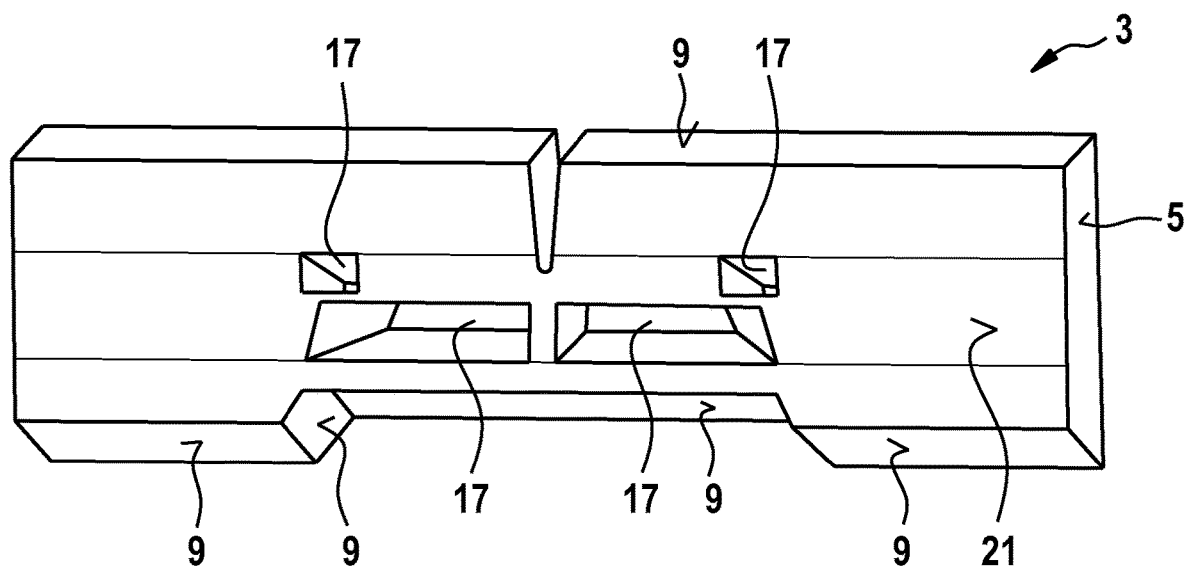
FIG. 7: a view of an inlet module, depicted schematically, of a preform device according to the invention.
Figure 8:
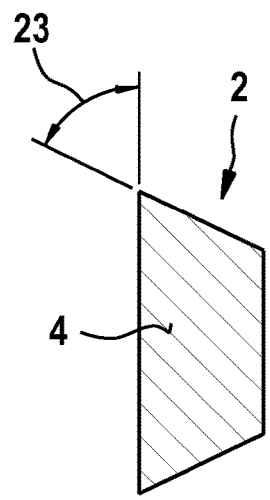
FIG. 8: a schematic depiction of the taper angle $ß_{In}$ of an inlet module of a preform device according to the invention.
Figure 9:
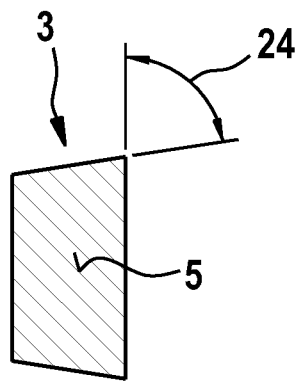
FIG. 9: a schematic depiction of the taper angle $ß_{Out}$ of an outlet module of a preform device according to the invention.
Figure 10:
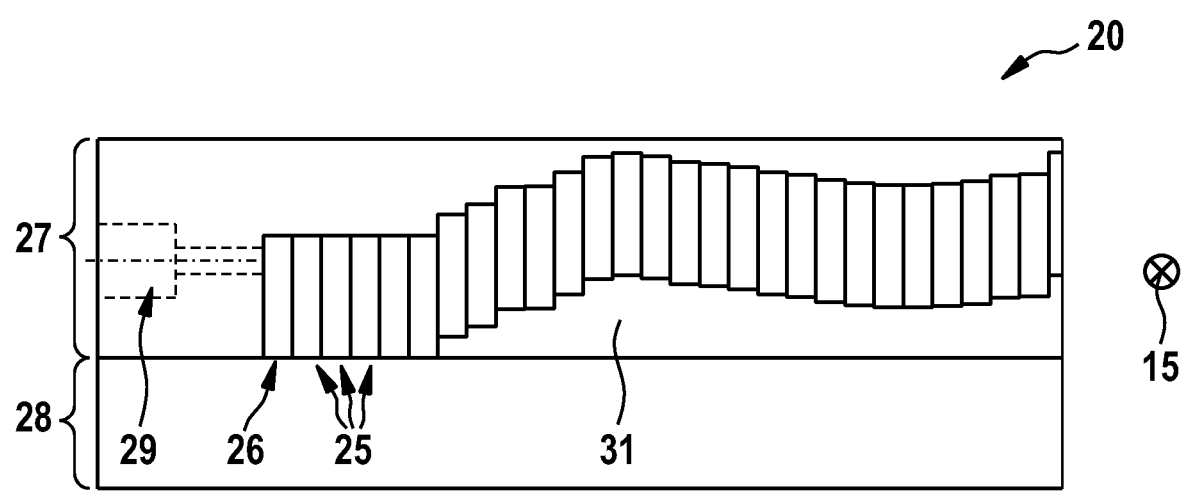
FIG. 10: a cross-sectional view through a portion of a final forming device, depicted schematically, of an extruder mold system according to the invention in one embodiment, wherein the cross-sectional plane runs perpendicularly to the extrusion direction and the vertically displaceable components are moved vertically such that they form an outlet opening.

1 Preform device
2 Inlet module
3 Outlet module
4 Side faces of inlet module with trapezoid surface
5 Side faces of outlet module with trapezoid surface
6 First flow duct
7 Second flow duct
8 Third flow duct
9 Side face of outlet module
10 Side face of inlet module
11 Base surface of outlet module
12 Base surface of inlet module
13 Outlet opening of a flow duct of the outlet module
14 Inlet opening of a flow duct of the inlet module
15 Extrusion direction
16 Flow duct of inlet module
17 Flow duct of outlet module
18 Receiving device of extruder system
19 Contact face of inlet module
20 Final forming device
21 Contact face of outlet module
22 Extruder system
23 Taper angle $ß_{In}$
24 Taper angle $ß_{Out}$
25 Vertically displaceable component
26 First end-mounted vertically displaceable component
27 Upper module of final forming device
28 Lower module of final forming device
29 Locking device for fixing the vertically displaceable components
30 Flow ducts of extruder heads
31 Outlet opening of flow duct of final forming device
40 Complete rubber element

The invention claimed is:

1. A preform device for positioning extruded rubber mixtures, wherein the preform device comprises:
an inlet module and an outlet module,
wherein both the inlet module and the outlet module each have a base surface and a contact face opposite the base surface, and wherein
the surface of the contact face of the inlet module is smaller than the surface of the base surface of the inlet module;
the inlet module comprises a first flow duct for the arrangement of a first extruded rubber mixture and a second flow duct for the arrangement of a second extruded rubber mixture;
the outlet module comprises a first flow duct for the arrangement of the first extruded rubber mixture and a second flow duct for the second extruded rubber mixture;
the inlet module and the outlet module are insertable in a receiving device of an extruder system independently of each other and from different directions and can separately be configured for a selected rubber extrusion profile
the inlet module configured to guide rubber components from an extruder head to one module of a plurality of outlet modules based on the selected profile;
the outlet module configured to guide the rubber components to one mold system of a plurality of extruder mold systems based on the selected profile.

2. The device of claim 1, wherein both the inlet module and the outlet module each have at least two opposing side faces, a base surface and a contact face opposite the base surface, and wherein
- the contact face of the inlet module is congruent with the contact face of the outlet module, and
- the two opposing side faces of the inlet module each have a trapezoid surface with a taper angle $ß_{In}$, and each of the two opposing side faces tapers towards the contact face of the inlet module, and
- the two opposing side faces of the outlet module each have a trapezoid surface with a taper angle $ß_{Out}$, and each of the two opposing side faces tapers towards the contact face of the outlet module.

3. The device of claim 1, wherein
- the total weight of the preform device is more than 25 kg and
- the total weight of the outlet module of the preform device is less than 20 kg.

4. The device of claim 1, wherein both the inlet module and the outlet module have at least
- a third flow duct provided for the arrangement of a third rubber component.

5. The device of claim 4, wherein both the inlet module and the outlet module have at least
- a fourth flow duct provided for the arrangement of a fourth rubber component, and/or
- a fifth flow duct provided for the arrangement of a fifth rubber component.

6. The device of claim 1, wherein the inlet module and the outlet module of the preform device are suitable for attachment to a receiving device of an extruder system.

7. The device of claim 1, wherein the inlet module of the preform device has
- a length in the range from 300 mm to 1200 mm, preferably in the range from 400 mm to 800 mm, and/or
- a height in the range from 60 mm to 300 mm, and/or
- a depth in the range from 40 mm to 150 mm, and/or
- a taper angle $ß_{In}$ (23) in the range from 30 to 60°.

8. The device of claim 1, wherein the outlet module of the preform device has
- a length in the range from 300 mm to 1200 mm, and/or
- a height in the range from 60 mm to 300 mm, and/or
- a depth in the range from 40 mm to 150 mm, and/or
- a taper angle $ß_{Out}$ in the range from 15° to 120°.

9. The device of claim 1, wherein a seal is attached to the contact face of the inlet module or to the contact face of the outlet module.

10. The device of claim 1, further comprising a final forming device for molding extruded rubber mixtures into a complete rubber element.

11. The device of claim 1, wherein the outlet module is introduced into a receiving device of an extruder system.

* * * * *